(12) United States Patent
Maida et al.

(10) Patent No.: US 9,926,778 B2
(45) Date of Patent: Mar. 27, 2018

(54) DOWNHOLE EM SENSING USING SAGNAC INTERFEROMETER FOR WELLBORE MONITORING

(71) Applicant: Halliburton Energy Services, Inc., Houston, TX (US)

(72) Inventors: John L. Maida, Houston, TX (US); Tasneem A. Mandviwala, Katy, TX (US); Allen Cekorich, Northridge, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/038,265

(22) PCT Filed: Dec. 20, 2013

(86) PCT No.: PCT/US2013/076984
§ 371 (c)(1),
(2) Date: May 20, 2016

(87) PCT Pub. No.: WO2015/094348
PCT Pub. Date: Jun. 25, 2015

(65) Prior Publication Data
US 2016/0298446 A1    Oct. 13, 2016

(51) Int. Cl.
| | |
|---|---|
| *E21B 47/10* | (2012.01) |
| *E21B 47/12* | (2012.01) |
| *G01V 3/30* | (2006.01) |
| *E21B 43/20* | (2006.01) |
| *G01C 19/72* | (2006.01) |

(52) U.S. Cl.
CPC ............ *E21B 47/102* (2013.01); *E21B 43/20* (2013.01); *E21B 47/123* (2013.01); *G01V 3/30* (2013.01); *G01C 19/722* (2013.01)

(58) Field of Classification Search
CPC ...... E21B 47/102; E21B 47/123; E21B 43/20; G01V 3/30; G01N 21/85; G01C 19/722
See application file for complete search history.

(56) References Cited

U.S. PATENT DOCUMENTS

| | | |
|---|---|---|
| 5,355,208 A | 10/1994 | Crawford et al. |
| 5,636,021 A | 6/1997 | Udd |
| 5,694,114 A | 12/1997 | Udd |
| 6,097,486 A | 8/2000 | Vakoc et al. |

(Continued)

OTHER PUBLICATIONS

International Preliminary Report on Patentability issued in related Application No. PCT/US2013/076984, dated Jun. 30, 2016 (11 pages).

(Continued)

*Primary Examiner* — Minh Phan
*Assistant Examiner* — Zannatul Ferdous
(74) *Attorney, Agent, or Firm* — John Wustenberg; Baker Botts L.L.P.

(57) ABSTRACT

Method and apparatus are disclosed for use of a fiber-optic sensor loop for use within a wellbore; with a plurality of light sources optically coupled to the fiber-optic sensor loop; at least one electromagnetically sensitized region within the fiber-optic sensor loop; and a plurality of detectors optically coupled to the fiber-optic sensor loop; and using the sensing system to detect changes in a magnetic field within the wellbore.

20 Claims, 2 Drawing Sheets

(56) References Cited

U.S. PATENT DOCUMENTS

| | | |
|---|---|---|
| 6,459,486 B1 | 10/2002 | Udd et al. |
| 6,480,000 B1 | 11/2002 | Kong et al. |
| 6,490,045 B1 | 12/2002 | Dakin et al. |
| 6,690,890 B1 | 2/2004 | Udd et al. |
| 2005/0088660 A1* | 4/2005 | Ronnekleiv ........ G01B 9/02007 356/478 |
| 2007/0126594 A1* | 6/2007 | Atkinson .............. E21B 47/123 340/853.1 |
| 2008/0066960 A1* | 3/2008 | Mathiszik ............... E21B 47/01 175/41 |
| 2010/0316328 A1 | 12/2010 | Arias Vidal et al. |
| 2013/0034351 A1* | 2/2013 | Goldner ............. G01D 5/35354 398/25 |
| 2013/0094011 A1 | 4/2013 | Barry et al. |
| 2013/0207661 A1* | 8/2013 | Ellingsrud ......... G01D 5/35303 324/334 |
| 2014/0139226 A1* | 5/2014 | Jaaskelainen ............ G01V 3/26 324/344 |

OTHER PUBLICATIONS

International Search Report and Written Opinion issued in related PCT Application No. PCT/US2013/076984 dated Sep. 17, 2014, 14 pages.

\* cited by examiner

DOWNHOLE EM SENSING USING SAGNAC INTERFEROMETER FOR WELLBORE MONITORING

CROSS-REFERENCE TO RELATED APPLICATION

The present application is a U.S. National Stage Application of International Application No. PCT/US2013/076984 filed Dec. 20, 2013, which is incorporated herein by reference in its entirety for all purposes.

BACKGROUND

The present disclosure relates generally to well drilling operations and, more particularly, to a methods and systems for monitoring a wellbore using an interferometer.

During an oil recovery operation, water injection is often used to aid in recovery of production fluids. However, implementation of a waterflood program may result in injector-producer linkages, uncontrolled hydrofracture growth, water breakthrough in thief layers, or other issues resulting from water injection supported production. These conditions may result in the loss of hydrocarbon production and/or production of large volumes of water. Monitoring the waterflood injection can help solve these problems.

Various types of interferometers have been used to locate and/or detect longitudinal positions of time-varying disturbances in a non-central location within the sensing loop. The Sagnac interferometer is one of the general arrangements of interferometers that has been used to detect mechanical or thermal disturbances or vibrations. The Sagnac interferometer operates by generating a light signal with a predetermined wavelength, transmitting the light signal through an optical fiber loop, and detecting the resulting coherent light phase shift. The characteristics of the coherent light phase shift is known in the art to provide information regarding physical disturbances or vibrations located within the loop of the Sagnac interferometer.

High Data Rate Telemetry used in drilling wellbores requires high efficiency of pressure pulse detection and requires high bit rate transmission. However, standard electromechanical gages cannot meet this technical data requirement. A Sagnac interferometer could be used for pressure pulse detection. However, the reference loop module of the interferometer must be isolated from environmental noise and vibration. Vibration dampening fillers and various signal filtering techniques have been used to limit the effect of these interfering factors with various degrees of effectiveness.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to a methods and systems for monitoring a wellbore using an interferometer.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

The terms "couple" or "couples" as used herein are intended to mean either an indirect or direct connection. Thus, if a first device couples to a second device, that connection may be through a direct connection, or through an indirect mechanical or electrical connection via other devices and connections. The term "uphole" as used herein means along the drillstring or the hole from the distal end towards the surface, and "downhole" as used herein means along the drillstring or the hole from the surface towards the distal end.

To facilitate a better understanding of the present disclosure, the following examples of certain embodiments are given. In no way should the following examples be read to limit, or define, the scope of the disclosure.

Figure 1:
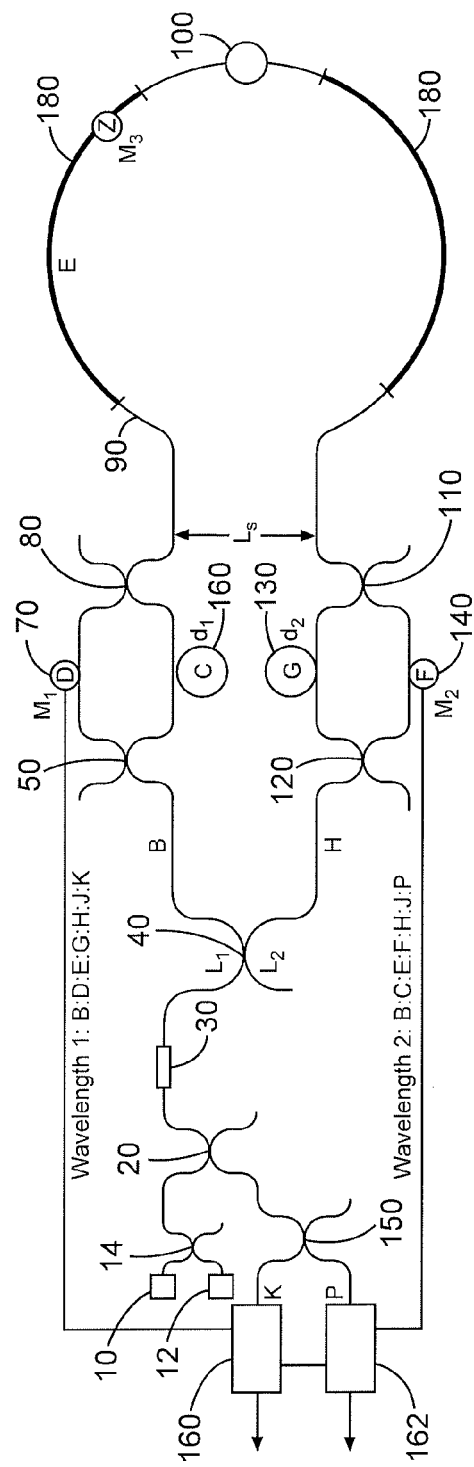
FIG. 1 shows an example optical architecture of an optical interferometer system used to detect downhole electromagnetic fields, according to aspects of the present disclosure.

FIG. 1 shows a schematic diagram of an optical sensor system 1 according to aspects of the present disclosure. The optical sensor system 1 is supplied with light from a first broadband source 10 and a second broadband source 12. In certain embodiments, a laser, a light emitting diode (LED), or any light source capable of emitting light at desired frequencies may be used as the broadband source 10 and/or the second broadband source 12. The first broadband source 10 may emit light at a first wavelength and the second broadband source 12 may emit light at a second wavelength. In certain embodiments, the first wavelength and the second wavelength may be different from one another. The output of the first broadband source 10 may be connected to a first input of a first wavelength division multiplexer (WDM) 14. In certain embodiments, the first WDM 14 may be a biconically fused fiber taper WDM. The output of the second broadband source 12 may be connected to a second input of the first WDM 14. The first WDM 14 may be configured to combine the separate light outputs from the first broadband source 10 and the second broadband source 12. The first WDM 14 may be connected to a first of two inputs of a first optical coupler 20. In certain embodiments, the first optical coupler 20 may be a bidirectional four-port device with one unused port.

The first optical coupler 20 may be connected to an optical polarizer 30, to allow light to pass from the first broadband source 10 and the second broadband source 12 to the optical polarizer 30. The polarizer 30 may allow optical reciprocity within the optical sensor system 1.

The output of the polarizer 30 may be connected to a first of two inputs of a second optical coupler 40. In certain embodiments, the second optical coupler 40 may be a bidirectional four-port device with one unused port. The output of the second optical coupler 40 may be connected to a second WDM 50 and a fifth WDM 120. In certain embodiments, the second WDM 50 and/or the fifth WDM 120 may be a biconically fused fiber taper WDM. The second optical coupler 40 may be configured to split the light received from the polarizer 30 into a clockwise path and a counterclockwise path, sending the clockwise path to the second WDM 50 and the counterclockwise path to the fifth WDM 120.

The clockwise path of light sent to the second WDM 50 will be discussed first. The second WDM 50 may be configured to spectrally slice the broadband light generated by the first broadband source 10 and the second broadband source 12 and received from the second optical coupler 40 into a first bandwidth channel and a second bandwidth channel, respectively. In certain embodiments, the first bandwidth channel may include substantially only light emitted by the first bandwidth source 10 and the second bandwidth channel may include substantially only light emitted by the second bandwidth source 12. For example, the first broadband source 10 may provide light at a wavelength of about 1570 nm and the second broadband source 12 may provide light at a wavelength of about 1540 nm, which may be spectrally sliced by the second WDM 50 into the first bandwidth channel and the second bandwidth channel having central wavelengths at 1570 nm and 1540 nm, respectively.

The second WDM 50 may have two outputs which are indirectly connected to two inputs of a third WDM 80. A first output of the second WDM 50 may be connected to a first input of the third WDM 80 via a first phase modulator 70. In certain embodiments, the first phase modulator may be a piezo electric fiber stretching device. A second output of the second WDM 50 may be connected to a second input of the third WDM 80 via a first delay coil 60.

The first bandwidth channel may pass along the optical path defined between the first output of the second WDM 50, through the first phase modulator 70 and to the first input of the third WDM 80. The second bandwidth channel may pass along the optical path defined between the second output of the second WDM 50, through the first delay coil 60 and to the second input of the third WDM 80. The bandwidth channels, which have traveled along different optical paths, may then be recombined in the third WDM 80.

The output of the third WDM 80 may be connected to a first end of a fiber optic sensor loop 90. For purposes of explanation, the first end of the fiber optic sensor loop 90 is defined to be at distance z=0. In certain embodiments, the sensor loop may be from about 2 km to about 30 km in length. In certain embodiments, the sensor loop may be from about 4 km to about 22 km in length. A second end of the sensor loop 90 may be defined to be at distance z=L. The second end of the sensor loop 90 may be connected to a port of a fourth WDM 110 that splits the light (previously recombined by the third WDM 80) into substantially the same first bandwidth channel and second bandwidth channel as previously resulted from the split by the second WDM 50. As such, the light emitting from the third WDM 80 may travel around the sensor loop 90 as a composite signal before being split again.

A Lyot depolarizer 100 may be placed halfway between the third WDM 80 and the fourth WDM 110, at a distance of z=L/2 around the sensor loop 90. The Lyot depolarizer 100 may minimize polarization fading by scrambling the polarizing state of propagating light.

The fourth WDM 110 may have two outputs indirectly connected to two inputs of a fifth WDM 120. A first output of the fourth WDM 110 may be connected to a first input of the fifth WDM 120 via a second delay coil 130, which may be constructed similarly to the first delay coil 60. The second output of the fourth WDM 110 may be connected to a second input of the fifth WDM 120 via a second phase modulator 140. In certain embodiments, the second phase modulator may be a piezo electric fiber stretching device.

In contrast to its path between the second WDM 50 and the third WDM 80, the first bandwidth channel may pass along the optical path defined between the first output of the fourth WDM 110, through the second delay coil 130 and to the first input of the fifth WDM 120. The second bandwidth channel may pass along the optical path defined between the second output of the fourth WDM 110, through the second phase modulator 140 and to the second input of the fifth WDM 120. The two separate bands of wavelengths may be recombined in the fifth WDM 120.

An output of the fifth WDM 120 may be connected to the second of the two inputs of the second optical coupler 40 allowing light on the clockwise path to pass from the fifth WDM 120 to the second optical coupler 40, where it may be recombined with light from the counterclockwise path.

Returning back to the light split by the second optical coupler 40, the light may be split into a counterclockwise path sent to the fifth WDM 120. The counterclockwise path may be substantially similar to the clockwise path, the difference being that the counterclockwise path travels through the sensor loop in the opposite direction of the clockwise path. The fifth WDM 120 may be configured to spectrally slice the broadband light generated by the first broadband source 10 and the second broadband source 12 and received from the second optical coupler 40 into a first bandwidth channel and a second bandwidth channel, respectively. In certain embodiments, the first bandwidth channel may include substantially only light emitted by the first bandwidth source 10 and the second bandwidth channel may include substantially only light emitted by the second bandwidth source 12.

The fifth WDM 120 may have two outputs that may be indirectly connected to two inputs of the fourth WDM 110. A first output of the fifth WDM 120 may be connected to a first input of the fourth WDM 110 via the second delay coil 130. A second output of the fifth WDM 120 may be connected to a second input of the fourth WDM 110 via the second phase modulator 140.

The first bandwidth channel may pass along the optical path defined between the first output of the fifth WDM 120, through the second delay coil 130 and to the first input of the fourth WDM 110. The second bandwidth channel may pass along the optical path defined between the second output of the fifth WDM 120, through the second phase modulator 140 and to the second input of the fourth WDM 110. The bandwidth channels, which have traveled along different optical paths, may then be recombined in the fourth WDM 110.

The output of the fourth WDM 110 may be connected to the second end of the fiber optic sensor loop 90. The first end of the fiber optic sensor loop 90 may be connected to the port of the third WDM 80, as described above. The third WDM 80 may receive the light traveling on the counterclockwise path through the sensor loop and split the light (previously recombined by the fourth WDM 110) into substantially the same first bandwidth channel and second bandwidth channel as previously resulted from the split by the fifth WDM 120. As such, the light emitting from the fourth WDM 110 may travel around the sensor loop 90 as a composite signal before being split again.

The third WDM 80 may have two outputs indirectly connected to two inputs of the second WDM 120. A first output of the third WDM 80 may be connected to a first input of the second WDM 50 via the second phase modulator 70. A second output of the third WDM 80 may be connected to a first input of the second WDM 50 via the first delay coil 60. In certain embodiments, the second phase modulator may be a piezo electric fiber stretching device.

In contrast to its path between the fifth WDM 50 and the fourth WDM 80, the first bandwidth channel may pass along the optical path defined between the first output of the third WDM 80, through the first phase modulator 140 and to the first input of the second WDM 50. The second bandwidth channel may pass along the optical path defined between the second output of the third WDM 80, through the first delay coil 60 and to the second input of the second WDM 50. The two separate bands of wavelengths may be recombined in the second WDM 50.

An output of the second WDM 50 may be connected to the first of the two inputs of the second optical coupler 40 allowing light on the counterclockwise path to pass from the second WDM 50 to the second optical coupler 40, where it may be recombined with light from the clockwise path.

The light, now combined from the clockwise path and the counterclockwise paths, may then pass from the second optical coupler 40 back through the polarizer 30 and the first optical coupler 20 to a sixth WDM 150. The sixth WDM 150 may have two outputs, where the first output of the sixth WDM 150 may be connected to a first orthogonal phase demodulator (OPD) 160 and the second output of the sixth WDM 150 may be connected to a second OPD 162. The sixth WDM 150 may pass light at the first bandwidth channel to the first OPD 160 and light at a second bandwidth channel to the second OPD 162. As such, light emitted from the first broadband source 10 may be received by the first OPD 160 and light emitted from the second broadband channel 12 may be received by the second OPD 162. In certain embodiments, the first OPD and/or the second OPD may be an Optiphase OPD-4000 Orthogonal Phase Demodulator from Halliburton, Houston, Tex.

Thus, two essentially independent Sagnac interferometer loops may be formed by splitting the light emitted by the first broadband source 10 into the first bandwidth channel and the light emitted by the second broadband source 12 into the second bandwidth channel. In FIG. 1, a first Sagnac interferometer loop may be defined along the clockwise path BDEGHJK and a second Sagnac interferometer loop may be defined along the clockwise path BCEFHJP. As such, the effective center of each of the Sagnac interferometer loops may be offset in opposite directions from the geometric center of the sensor loop 90, at z=L/2. This relative offset may provide different responses to a common disturbance.

In certain embodiments, the first phase modulator 70 may modulate the first bandwidth channel using sinusoidal phase biasing at a first frequency (f1). In certain embodiments, the second phase modulator 140 may modulate the second bandwidth channel using sinusoidal phase biasing at a second frequency (f2), which may be different from the first frequency. The output of each OPD demodulator may be the phase of the respective loop sampled once each frequency period. The two phase readings from each of the two loops may be used to locate a disturbance on the sensor fiber.

When a phase perturbation φ occurs at a distance z from the center of the sensor loop 90, it phase-modulates the light traveling in one direction before light traveling in the other direction. As a result, a net phase modulation Δφ between the two counter-propagating wavetrains, which may interfere when combined at the output of the loop. The net phase modulation Δφ may be given by $$\Delta\phi(t) \approx \frac{2z}{V_g} \frac{d\phi(t)}{dt}$$

where $V_g$ is the group velocity of the guided light. As such, a disturbance acting on the sensor loop 90 may cause a net phase modulation of light received by the first OPD 160 and/or the second OPD 162. In addition, the response from each of the two Sagnac interferometer loops may be dependent on the rate of change of the disturbance and its position relative to the center of the sensor loop, which again, may be different for each Sagnac loop due to the different locations of the first and second delay coils 60, 130.

The sensor loop 90 may comprise at least one sensitized fiber region 180. The sensitized fiber region 180 may be coated with a ferromagnetic substance. In certain embodiments, the ferromagnetic substance may be metglas, nickel, or any other suitable material with ferromagnetic properties.

The sensitized fiber region 180 may allow the sensor loop 90 to detect changes in electromagnetic fields acting on the sensor loop 90. Changes in electromagnetic fields acting on the sensor loop 90 may cause stress, strain, and/or some other disturbance to the sensitized fiber region 180, in turn causing a net phase modulation of the light received at the first OPD 160 and/or the second OPD 162.

In certain embodiments, the optical sensor system may be used to determine the position of a disturbance. An example disturbance position calculation will now be illustrated; however, the present disclosure should not be limited by this example. Other methods of finding the position of a sensed disturbance may be used.

For example, the disturbance may cause an optical path change at position $l_1$ on the sensor loop. The optical path change at position $l_1$ may be modeled as a sine function with amplitude $M_3$ radians and frequency $F_3$ hertz:

$$M_3[t] = M_3 \cdot \cos[2\pi F_3 \cdot t]$$

The gain of the first loop (G1) and the gain of the second loop (G2) may be modeled as follows:

$$G1 = \sin\left[2\pi F_3 \cdot \frac{\eta}{2c} \cdot \left(\frac{L_S + d_1}{2} - l_1\right)\right]$$

$$G2 = \sin\left[2\pi F_3 \cdot \frac{\eta}{2c} \cdot \left(\frac{L_S + d_2}{2} - l_1 - \frac{d_1 + d_2}{2}\right)\right]$$

Where η is the index of refraction, c is the speed of light, $L_s$ is the length of the sensor, and $d_1$ and $d_2$ are the lengths of the respective delay coils. G1 and G2 may include a position dependent phase ($a_1$) and a known phase (b) that depends on the fixed lengths of the first delay coil ($d_1$) and the second delay coil ($d_2$):

$$a_1 = 2\pi F_3 \cdot \frac{\eta}{2c} \cdot \left(\frac{L_S + d_1}{2} - l_1\right)$$

-continued $$b = 2\pi F_3 \cdot \frac{\eta}{2c} \cdot \left(\frac{d_1 + d_2}{2}\right)$$

If G1 and G2 is represented by phase a1 and phase b, one of ordinary skill in the art with the benefit of this disclosure will recognize that two quadrature measures, GS and GC, may be formed by multiplying the G1 function by the delay coil factor, sin(b), where GS depends on the sine of the position and GC depends on the cosine of the position:

$GS = \sin[a_1] \cdot \sin[b]$ $GC = \cos[a_1] \cdot \sin[b]$

The two quadrature measures may provide a value for the position $l_1$ by using an inverse tangent since common factors cancel in the inverse tangent ratio such that $a_1 = \text{ArcTan}[GC, GS]$. This phase, $a_1$, may then be used to solve for position $l_1$ of the optical change common to the two interferometer loops. In certain embodiments, the delay coil gain may be substantially maximized when b is equal to π divided by 2, making GC and GS as large as possible. When b is set equal to π divided by 2, the known phase, b, equation may be simplified to:

$$\frac{d_1 + d_2}{2} = \frac{1}{2F_3} \cdot \frac{c}{\eta}$$

Thus, in certain embodiments, the coil length may be inversely dependent on the optical change frequency, $F_3$.

Since GC and GS are not directly measured as a result of the disturbance at position $l_1$, the phase outputs ($\Delta_1$ and $\Delta_2$) measured by the first and second OPD, respectively, may be represented by the functions:

$$\Delta 1[t] = G1[l_1] \cdot 2M_3 \cdot \cos\left[2\pi F_3 \cdot \left(t - \frac{\eta}{c} \cdot \frac{L_1}{2}\right)\right]$$

$$\Delta 2[t] = G2[l_1] \cdot 2M_3 \cdot \cos\left[2\pi F_3 \cdot \left(t - \frac{\eta}{c} \cdot \frac{L_2}{2}\right)\right]$$

Where $L_1$ and $L_2$ are the respective lengths of each loop. The phase output of the first loop ($\Delta_1$) may be measured by the first OPD at a frequency $F_1$ corresponding to the frequency applied by the first phase modulator. The phase output of the second loop ($\Delta_2$) may be measured by the second OPD at a frequency $F_2$ corresponding to the frequency applied by the second phase modulator. The frequencies $F_1$ and $F_2$ may be made the same and the two interferometer loops may be sampled by the first OPD and the second OPD at the same time, producing two time series $\Delta 1_k$ and $\Delta 2_k$ for a sample number of k taken every $1/F_1$ seconds. The time series $\Delta 1_k$ and $\Delta 2_k$ may be converted into respective Fourier transforms FFT1 and FFT2. The amplitude and frequency $F_3$ may be computed from the FFT1 and FFT2, where the $j^{th}$ element is at the frequency $F_3$. As a result, the FFT1 and FFT2 functions measure the amplitudes which may be expressed with the absolute values of G1 and G2, respectively:

$|FFT1_j| = |G1 \cdot 2M_3|$ $|FFT2_j| = |G2 \cdot 2M_3|$

G1 and G2 may be expressed in two quadrature measures: GS, depending on the sine of the position, and GC, depending on the cosine of the position:

$$GS = FFT1_j \cdot \sin\left[2\pi F_3 \cdot \frac{\eta}{2c} \cdot \left(\frac{d_1 + d_2}{2}\right)\right]$$

$$GC = FFT1_j \cdot \cos\left[2\pi F_3 \cdot \frac{\eta}{2c} \cdot \left(\frac{d_1 + d_2}{2}\right)\right] - FFT2_j$$

The inverse tangent may be computed from the quadrature gains, where the angle may allow the computation of the position $l_1$ of the optical path change caused by the disturbance. While the above illustration is provided with respect to an optical path change modeled by a sine function, a path change that does not use a pure sine function may be allowed by computing the Fourier transform, choosing those elements that have high energy, and computing the quadrature measures, GS and GC, using the frequency of those elements. In addition, more than one sensor disturbance may be located at the same time by using Fourier transforms when each disturbance occurs in a separated frequency band.

Figure 2:
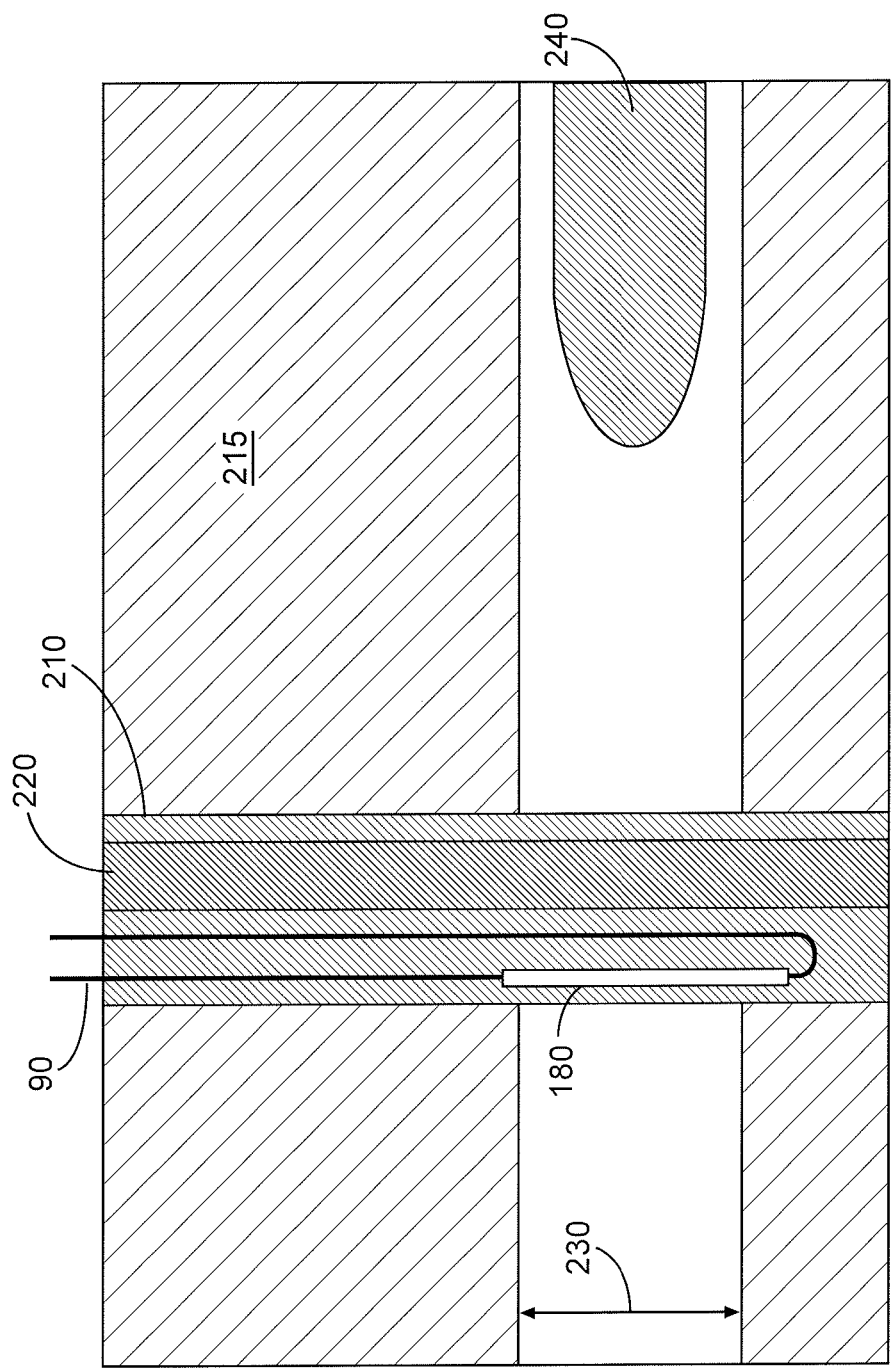
FIG. 2 shows an illustration of an optical interferometer system placed downhole, according to aspects of the present disclosure.

FIG. 2 illustrates an embodiment of the optical sensor system 1 in a downhole configuration. The sensor loop 90 may be disposed in a wellbore 210 within a subterranean formation 215. The wellbore 210 is show to be lined with a casing 220, and formation 215 is shown to contain a waterfront 240 within a depth of interest 230. In certain embodiments, the depth of interest 230 may be from about 3000 feet to about 5000 feet below the surface of the formation 215. The sensitized fiber region 180 may have a length corresponding to the length of the depth of interest 230. In certain embodiments, the sensitized fiber region 180 may have a length of about 2000 feet.

The sensor loop 90 may be disposed between the casing 220 and the formation 215. The wellbore 210 may be part of an oil-well production environment and may contain oil-well production equipment (not shown) such as production tubing, a production packer, or other equipment known to those of skill in the art.

The sensor loop 90 may be placed in the wellbore 210 such that the sensitized fiber region 180 may be located within the depth of interest 230. In certain embodiments, the sensor loop 90 may be located within cement between the casing 220 and the formation 215. Placing the sensor loop 90 in the cement may allow the optical sensor system 1 to be installed permanently for the life of the well. In certain embodiments, the sensor loop 90 may be attached to the casing 220.

In certain embodiments, all components of the optical sensor system 1 except the sensor loop 90 may stay at the surface, minimizing the deployment of electronic components in the downhole environment.

In certain embodiments, a transmitter may be disposed on the casing 220. The transmitter may generate at least one primary magnetic field that interacts with the formation, which creates at least one secondary magnetic field in result. The at least one secondary magnetic field may have properties that are a function of the formation resistivity. As such, changes to the at least one secondary magnetic field may indicate a change in the formation resistivity. The at least one secondary magnetic field may induce a strain on the sensitized fiber region 180 that correlates to the resistivity of the formation 215. As such, a change in the formation resistivity may cause a corresponding change in the strain on the sensitized fiber region 180. At 1 meter resolution, where the sensitized fiber region 180 is 1 meter long, the optical sensor system 1 may allow detection of the waterfront 10 feet from the casing. In certain embodiments, the optical sensor system 1 may have a spatial resolution of about 10 meters. In certain embodiments, a higher spatial resolution may be desired The optical sensor system described herein may be used in production environments where water has been injected to increase pressure and assist in the production of oil. In certain embodiments, the optical sensor system may be used to monitor the status of flood injection. The optical sensor system may be part of a trigger system to alert the operator to a change in the waterfront, which may allow the operator to investigate the status of the waterfront and/or adjust the production operation. As such, the optical sensor system may alert the operator a potential water breakthrough event. In certain embodiments, the optical sensor system may alert the operator of a change to the resistivity contrasts of the formation, obtained from the measurement of magnetic fields in the reservoir detected by the sensitized sensor loop. In response to changes to the waterfront as detected by disturbances to the optical sensor system, the operator may make adjustments to the production operation to avoid production of water, such as, for example, shutting down the affected zone. In certain embodiments, the optical sensor system may be used to determine the location of the waterfront of injected water.

In certain embodiments, a method of sensing may comprise providing a sensor loop, wherein the sensor loop is disposed within a wellbore; optically coupling a plurality of light sources to the sensor loop; optically coupling a plurality of detectors to the sensor loop; sending light from the plurality of light sources through the sensor loop; and detecting a disturbance to the sensor loop caused by a magnetic field.

In certain embodiments, a method of sensing a magnetic field may comprise providing an optical sensing system, comprising: a fiber-optic sensor loop, a plurality of light sources optically coupled to a first end of the fiber-optic sensor loop; at least one electromagnetically sensitized region within the fiber-optic sensor loop; and a plurality of detectors optically coupled to a second end of the fiber-optic sensor loop; placing the fiber-optic sensor loop in a wellbore; sending light from the plurality of light sources through the fiber-optic sensor loop; and detecting a disturbance to the fiber-optic sensor loop caused by a magnetic field.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A sensing system, comprising:
a fiber-optic sensor loop disposed within a wellbore;
a plurality of light sources optically coupled to the fiber-optic sensor loop wherein the plurality of light sources comprises a first light source that emits light at a first wavelength and a second light source that emits light at a second wavelength;
a first output of the first light source coupled to a first input of a first wavelength division multiplexer;
a second output of the second light source coupled to a second input of the first wavelength division multiplexer, wherein the first wavelength division multiplexer combines the first output and the second output;
a polarizer coupled to the first wavelength division multiplexer, wherein the polarizer receives the combined first output and the second output;
a first optical coupler coupled to the polarizer, wherein the first optical coupler splits the combined first output and the second output into a clockwise path to a second wavelength divisional multiplexer and a counterclockwise path to a third divisional multiplexer, and wherein a clockwise center of the clockwise path and a counterclockwise center of the counterclockwise path are offset in opposite direction from a geometric center of the fiber-optic sensor loop;
at least one electromagnetically sensitized region within the fiber-optic sensor loop that allows the fiber-optic sensor loop to detect changes in one or more electromagnetic fields acting on the fiber-optic sensor loop based, at least in part, on a first gain modeled for the clockwise path and a second gain modeled for the counterclockwise path; and
a plurality of detectors optically coupled to the fiber-optic sensor loop.

2. The sensing system of claim 1, wherein the plurality of light sources are broadband light sources.

3. The sensing system of claim 1, wherein the plurality of detectors are orthogonal phase demodulators.

4. The sensing system of claim 1, further comprising a lyot depolarizer connected to the sensor loop and located at approximately a sensor loop midpoint.

5. The sensing system of claim 1, wherein the electromagnetically sensitized region comprises a ferromagnetic coating.

6. The sensing system of claim 1, wherein the fiber-optic sensor loop is attached to a casing string located in the wellbore.

7. The sensing system of claim 1, wherein the electromagnetically sensitized region is placed in a depth of interest having a waterfront.

8. A method of sensing, comprising:
providing a fiber-optic sensor loop, wherein the fiber-optic sensor loop is disposed within a wellbore;
optically coupling a plurality of light sources to the fiber-optic sensor loop, wherein the plurality of light sources comprises a first light source that emits light at a first wavelength and a second light source that emits light at a second wavelength; optically coupling a first output of the first light source to a first input of a first wavelength division multiplexer;
optically coupling a second output of the second light source to a second input of the first wavelength division multiplexer, wherein the first wavelength division multiplexer combines the first output and the second output;
optically coupling a polarizer to the first wavelength division multiplexer, wherein the polarizer receives the combined first output and the second output;
optically coupling a first optical coupler to the polarizer, wherein the first optical coupler splits the combined first output and the second output into a clockwise path to a second wavelength divisional multiplexer and a counterclockwise path to a third divisional multiplexer, and wherein a clockwise center of the clockwise path and a counterclockwise center of the counterclockwise path are offset in opposite direction from a geometric center of the fiber-optic sensor loop;

optically coupling a plurality of detectors to the fiber-optic sensor loop; sending light from the plurality of light sources through the fiber-optic sensor loop;

and detecting a disturbance that causes an optical path change at a first position on the fiber-optic sensor loop, wherein the disturbance is caused by a magnetic field based, at least in part, on a first gain modeled for the clockwise path and a second gain modeled for the counterclockwise path.

9. The method of claim 8, wherein the fiber-optic sensor loop further comprises at least one electromagnetically sensitized region.

10. The method of claim 9, wherein the electromagnetically sensitized region comprises a ferromagnetic coating.

11. The method of claim 8, wherein detecting a disturbance to the fiber-optic sensor loop comprises determining a location of the disturbance to the fiber-optic sensor loop.

12. The method of claim 11, wherein determining the location of the disturbance comprises detecting a first disturbance and a second disturbance to the fiber-optic sensor loop and determining a first location of the first disturbance and a second location of the second disturbance, wherein the first disturbance and the second disturbance occur at substantially the same time.

13. The method of claim 8, wherein the plurality of detectors are orthogonal phase demodulators.

14. The method of claim 8, wherein detecting a disturbance to the fiber-optic sensor loop caused by a magnetic field further comprises detecting a change to the magnetic field within a depth of interest, and wherein the change to the magnetic field is caused by a waterfront.

15. A method of sensing a magnetic field, comprising:
providing an optical sensing system, comprising:
a fiber-optic sensor loop,
a plurality of light sources optically coupled to a first end of the fiber-optic sensor loop, wherein the plurality of light sources comprises a first light source that emits light at a first wavelength and a second light source that emits light at a second wavelength;
a first output of the first light source coupled to a first input of a first wavelength division multiplexer;
a second output of the second light source coupled to a second input of the first wavelength division multiplexer, wherein the first wavelength division multiplexer combines the first output and the second output;
a polarizer coupled to the first wavelength division multiplexer, wherein the polarizer receives the combined first output and the second output;
a first optical coupler coupled to the polarizer, wherein the first optical coupler splits the combined first output and the second output into a clockwise path to a second wavelength divisional multiplexer and a counterclockwise path to a third divisional multiplexer, and wherein a clockwise center of the clockwise path and a counterclockwise center of the counterclockwise path are offset in opposite direction from a geometric center of the fiber optic sensor loop;
at least one electromagnetically sensitized region within the fiber-optic sensor loop that allows the fiber-optic sensor loop to detect changes in one or more electromagnetic fields acting on the fiber-optic sensor loop; and
a plurality of detectors optically coupled to a second end of the fiber-optic sensor loop;
placing the fiber-optic sensor loop in a wellbore;
sending at least the light at the first wavelength from the first light source and the light at the second wavelength from the second light source through the fiber-optic sensor loop; and
detecting a disturbance to the fiber-optic sensor loop caused by a magnetic field based, at least in part, on a first gain modeled for the clockwise path and a second gain modeled for the counterclockwise path.

16. The method of claim 15, wherein the plurality of detectors are orthogonal phase demodulators.

17. The method of claim 15, wherein the least one electromagnetically sensitized region comprises a ferromagnetic coating.

18. The method of claim 15, wherein placing the fiber-optic sensor loop in a wellbore further comprises attaching the fiber-optic sensor loop to a casing string.

19. The method of claim 15, wherein placing the fiber-optic sensor loop in a wellbore, further comprises placing the at least one electromagnetically sensitized region within a depth of interest.

20. The method of claim 15, wherein detecting a disturbance to the fiber-optic sensor loop comprises determining the location of the disturbance to the fiber-optic sensor loop.

* * * * *